US012120220B2

(12) United States Patent
Woodward et al.

(10) Patent No.: US 12,120,220 B2
(45) Date of Patent: *Oct. 15, 2024

(54) SYSTEMS AND METHODS FOR FACILITATING ASYNCHRONOUS SECURED POINT-TO-POINT COMMUNICATIONS

(71) Applicant: SHAYRE, INC., Burbank, CA (US)

(72) Inventors: Christopher John Woodward, Hermosa Beach, CA (US); Christopher Joseph Monte, Los Angeles, CA (US); Matthew Lyle Comeione, Burbank, CA (US)

(73) Assignee: Shayre, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,292

(22) Filed: Feb. 27, 2023

(65) Prior Publication Data

US 2023/0216665 A1 Jul. 6, 2023

Related U.S. Application Data

(63) Continuation of application No. 17/361,274, filed on Jun. 28, 2021, now Pat. No. 11,621,830.

(51) Int. Cl.
*H04L 9/08* (2006.01)
(52) U.S. Cl.
CPC ............ *H04L 9/0825* (2013.01); *H04L 9/088* (2013.01); *H04L 9/0891* (2013.01)

(58) Field of Classification Search
CPC ...... H04L 9/0825; H04L 9/088; H04L 9/0891
See application file for complete search history.

(56) References Cited

U.S. PATENT DOCUMENTS

| 6,678,682 | B1 | 1/2004 | Jenkins |
| 7,613,770 | B2 | 11/2009 | Li |
| 7,703,142 | B1 | 4/2010 | Wilson |
| 8,122,488 | B2 | 2/2012 | Hoch |
| 8,266,433 | B1 | 9/2012 | Przykucki |
| 8,745,718 | B1 | 6/2014 | Dufel |
| 8,800,027 | B1 | 8/2014 | Ackerman |
| 9,104,844 | B2 | 8/2015 | Fang |
| 9,122,848 | B2 | 9/2015 | Jurkiewicz |
| 9,374,379 | B1 | 6/2016 | Hew |
| 9,426,185 | B1 | 8/2016 | Vora |
| 9,473,304 | B1 | 10/2016 | Dixon |
| 9,781,122 | B1 | 10/2017 | Wilson |
| 9,858,781 | B1 | 1/2018 | Campero |

(Continued)

*Primary Examiner* — Esther B. Henderson (57) ABSTRACT

Systems and methods for facilitating asynchronous secured point-to-point communications between a first user and a second user are disclosed. Particularly, the communications do not require centralized storage. Exemplary implementations may: store information electronically, including different types of client-specific information, hardware information, key information, and permission information; receive a communication request from a first user; transfer a response to the communication request; receive a status check request from the second user; transfer a response to the status check request; receive a transfer request from the second user; transfer a response to the transfer request; receive a status request from the first user; and transfer a response to the status request.

16 Claims, 4 Drawing Sheets

(56) References Cited

U.S. PATENT DOCUMENTS

| | | |
|---|---|---|
| 9,953,168 B1 | 4/2018 | Lango |
| 10,218,690 B2 | 2/2019 | Helsen |
| 10,223,541 B2 | 3/2019 | Balijepalli |
| 10,455,011 B2 | 10/2019 | Kendall |
| 10,467,385 B2 | 11/2019 | Ciszewski |
| 10,559,003 B1 | 2/2020 | Bitoun |
| 10,587,413 B1 | 3/2020 | Todd |
| 10,601,829 B1 | 3/2020 | Nelson |
| 10,644,890 B1 | 5/2020 | Peddada |
| 10,673,628 B1 | 6/2020 | Shtop |
| 10,715,516 B1 | 7/2020 | Colletta |
| 10,719,503 B1 | 7/2020 | Bar Oz |
| 10,742,638 B1 | 8/2020 | Fischer |
| 10,749,689 B1 | 8/2020 | Peddada |
| 11,012,237 B1 | 5/2021 | Sarda |
| 11,025,626 B1 | 6/2021 | Todd |
| 11,106,762 B1 | 8/2021 | Demillo |
| 11,128,464 B1 | 9/2021 | Loladia |
| 11,134,117 B1 | 9/2021 | Farhangi |
| 11,140,169 B1 | 10/2021 | Hamel |
| 11,159,338 B1 | 10/2021 | Roche |
| 11,159,511 B1 | 10/2021 | Geusz |
| 11,190,516 B1 | 11/2021 | Loladia |
| 11,218,314 B2 | 1/2022 | Tan |
| 11,233,802 B1 | 1/2022 | Rudeanu |
| 11,507,540 B1 * | 11/2022 | Todd ............... G06N 20/00 |
| 11,522,864 B1 | 12/2022 | Gohil |
| 11,544,356 B2 | 1/2023 | Huang |
| 11,595,215 B1 | 2/2023 | Madden |
| 11,595,389 B1 | 2/2023 | Madden |
| 11,632,362 B1 | 4/2023 | Woodward |
| 11,658,822 B1 | 5/2023 | Engers |
| 11,716,323 B1 | 8/2023 | Moghal |
| 11,811,739 B2 | 11/2023 | Fryer |
| 11,811,746 B2 | 11/2023 | Woodward |
| 2003/0023724 A1 | 1/2003 | Martin |
| 2004/0010471 A1 | 1/2004 | Lenard |
| 2005/0078825 A1 | 4/2005 | Ohmori |
| 2006/0155705 A1 | 7/2006 | Kamper |
| 2009/0113543 A1 | 4/2009 | Adams |
| 2010/0218237 A1 | 8/2010 | Ferris |
| 2010/0293614 A1 | 11/2010 | Vilppola |
| 2012/0150785 A1 | 6/2012 | Subramanya |
| 2013/0047229 A1 | 2/2013 | Hoefel |
| 2013/0097596 A1 | 4/2013 | Queru |
| 2013/0144633 A1 | 6/2013 | Guadarrama |
| 2013/0191884 A1 | 7/2013 | Leicher |
| 2014/0123124 A1 | 5/2014 | Gray |
| 2014/0189840 A1 | 7/2014 | Metke |
| 2014/0376721 A1 | 12/2014 | Perez |
| 2015/0082029 A1 | 3/2015 | Volchok |
| 2015/0143508 A1 | 5/2015 | Halibard |
| 2016/0072839 A1 | 3/2016 | Mortimore, Jr. |
| 2016/0087955 A1 | 3/2016 | Mohamad Abdul |
| 2016/0092696 A1 | 3/2016 | Guglani |
| 2016/0094531 A1 | 3/2016 | Unnikrishnan |
| 2016/0127352 A1 | 5/2016 | Xu |
| 2016/0134599 A1 | 5/2016 | Ross |
| 2016/0182314 A1 | 6/2016 | Will |
| 2016/0337369 A1 | 11/2016 | Sanso |
| 2017/0012980 A1 | 1/2017 | Sanso |
| 2017/0034172 A1 | 2/2017 | Biggs |
| 2017/0041144 A1 | 2/2017 | Krapf |
| 2017/0091474 A1 | 3/2017 | Boire-Lavigne |
| 2017/0093805 A1 | 3/2017 | Proulx |
| 2017/0093827 A1 | 3/2017 | Pandian |
| 2017/0118280 A1 | 4/2017 | Miyoshi |
| 2017/0134937 A1 | 5/2017 | Miller |
| 2017/0149755 A1 | 5/2017 | Soneda |
| 2017/0201499 A1 | 7/2017 | McLaughlin |
| 2017/0230825 A1 | 8/2017 | Counterman |
| 2017/0244695 A1 | 8/2017 | Lund |
| 2017/0250971 A1 | 8/2017 | Gillespie |
| 2017/0295159 A1 | 10/2017 | Arora |
| 2017/0331802 A1 | 11/2017 | Keshava |
| 2017/0331832 A1 | 11/2017 | Lander |
| 2017/0357784 A1 | 12/2017 | Duda |
| 2018/0026984 A1 | 1/2018 | Maker |
| 2018/0034858 A1 | 2/2018 | Gummaraju |
| 2018/0041336 A1 | 2/2018 | Keshava |
| 2018/0041491 A1 | 2/2018 | Gupta |
| 2018/0041598 A1 | 2/2018 | Vats |
| 2018/0060600 A1 | 3/2018 | Hamel |
| 2018/0063118 A1 | 3/2018 | England |
| 2018/0077144 A1 | 3/2018 | Gangawane |
| 2018/0083915 A1 | 3/2018 | Medam |
| 2018/0083941 A1 | 3/2018 | Thakkar |
| 2018/0083944 A1 | 3/2018 | Vats |
| 2018/0167214 A1 | 6/2018 | Volchok |
| 2018/0219846 A1 | 8/2018 | Poschel |
| 2018/0219863 A1 | 8/2018 | Tran |
| 2018/0278603 A1 | 9/2018 | Yabe |
| 2018/0302406 A1 | 10/2018 | Burckhardt |
| 2018/0316685 A1 | 11/2018 | Eberlein |
| 2018/0367526 A1 | 12/2018 | Huang |
| 2018/0367528 A1 | 12/2018 | Schwarz |
| 2019/0007409 A1 | 1/2019 | Totale |
| 2019/0028414 A1 | 1/2019 | Walker |
| 2019/0065725 A1 | 2/2019 | Liderman |
| 2019/0068568 A1 | 2/2019 | Liderman |
| 2019/0090174 A1 | 3/2019 | Rocci |
| 2019/0095516 A1 | 3/2019 | Srinivasan |
| 2019/0098056 A1 | 3/2019 | Pitre |
| 2019/0108097 A1 | 4/2019 | Zhuang |
| 2019/0132321 A1 | 5/2019 | Pitchaimani |
| 2019/0149576 A1 | 5/2019 | Rajadurai |
| 2019/0156008 A1 | 5/2019 | Tamura |
| 2019/0163912 A1 | 5/2019 | Kumar |
| 2019/0190912 A1 | 6/2019 | De Boer |
| 2019/0199530 A1 | 6/2019 | Reitsma |
| 2019/0205559 A1 | 7/2019 | Gupta |
| 2019/0238467 A1 | 8/2019 | Guan |
| 2019/0238518 A1 | 8/2019 | Wu |
| 2019/0253407 A1 | 8/2019 | Livanos |
| 2019/0260594 A1 | 8/2019 | Patrick |
| 2019/0278929 A1 | 9/2019 | Kakumani |
| 2019/0303600 A1 | 10/2019 | Hamel |
| 2019/0306138 A1 | 10/2019 | Carru |
| 2019/0306157 A1 | 10/2019 | Lores |
| 2019/0312857 A1 | 10/2019 | Lander |
| 2019/0312887 A1 | 10/2019 | Grimm |
| 2019/0327223 A1 | 10/2019 | Kumar |
| 2019/0334884 A1 | 10/2019 | Ross |
| 2019/0349426 A1 | 11/2019 | Smith |
| 2019/0356478 A1 | 11/2019 | Young |
| 2019/0356529 A1 | 11/2019 | Gulati |
| 2019/0372957 A1 | 12/2019 | Dunjic |
| 2019/0372960 A1 | 12/2019 | Huang |
| 2019/0377620 A1 | 12/2019 | Neijenhuis |
| 2019/0386831 A1 | 12/2019 | Jamkhedkar |
| 2019/0386981 A1 | 12/2019 | Ramesh Kumar |
| 2019/0394041 A1 | 12/2019 | Jain |
| 2020/0007524 A1 | 1/2020 | Kong |
| 2020/0007529 A1 | 1/2020 | Bahrenburg |
| 2020/0053091 A1 | 2/2020 | Childress |
| 2020/0059360 A1 | 2/2020 | Martynov |
| 2020/0076797 A1 | 3/2020 | Mihara |
| 2020/0084209 A1 | 3/2020 | Kram |
| 2020/0097972 A1 | 3/2020 | Karnik |
| 2020/0106763 A1 | 4/2020 | Pancholi |
| 2020/0125713 A1 | 4/2020 | Davis |
| 2020/0137078 A1 | 4/2020 | Tewari |
| 2020/0150980 A1 | 5/2020 | Huang |
| 2020/0220853 A1 | 7/2020 | Xu |
| 2020/0242212 A1 | 7/2020 | Gibb |
| 2020/0252388 A1 | 8/2020 | Tran |
| 2020/0257700 A1 | 8/2020 | Xiaoxiao |
| 2020/0280851 A1 | 9/2020 | Sethi |
| 2020/0287724 A1 | 9/2020 | Vaddi |
| 2020/0287848 A1 | 9/2020 | Yuki |
| 2020/0287880 A1 | 9/2020 | Getsin |
| 2020/0314211 A1 | 10/2020 | Oye |
| 2020/0320178 A1 | 10/2020 | Gallagher |
| 2020/0380108 A1 | 12/2020 | Cypriano |

(56) References Cited

U.S. PATENT DOCUMENTS

| | | | |
|---|---|---|---|
| 2020/0409934 A1 | 12/2020 | Bar Oz | |
| 2020/0412708 A1 | 12/2020 | Oberoi | |
| 2021/0006400 A1* | 1/2021 | Hu | G06F 21/64 |
| 2021/0019062 A1 | 1/2021 | Fessel | |
| 2021/0021418 A1 | 1/2021 | Makhalov | |
| 2021/0021609 A1 | 1/2021 | Smith | |
| 2021/0029110 A1 | 1/2021 | Yan | |
| 2021/0036850 A1 | 2/2021 | Sunkavally | |
| 2021/0044634 A1 | 2/2021 | Hughes | |
| 2021/0084020 A1 | 3/2021 | Larose | |
| 2021/0084032 A1 | 3/2021 | Ding | |
| 2021/0089634 A1 | 3/2021 | Lakshminarayana | |
| 2021/0099438 A1 | 4/2021 | Kurian | |
| 2021/0103461 A1 | 4/2021 | Esibov | |
| 2021/0105254 A1 | 4/2021 | Walters | |
| 2021/0126910 A1 | 4/2021 | Chauhan | |
| 2021/0136063 A1 | 5/2021 | Cheek | |
| 2021/0157896 A1 | 5/2021 | Hashmi | |
| 2021/0160236 A1 | 5/2021 | Ray | |
| 2021/0160237 A1 | 5/2021 | Rozner | |
| 2021/0192516 A1 | 6/2021 | Derosa-Grund | |
| 2021/0218726 A1 | 7/2021 | Sundararajan | |
| 2021/0218742 A1 | 7/2021 | Cook | |
| 2021/0218743 A1 | 7/2021 | Ahuja | |
| 2021/0224300 A1 | 7/2021 | Rayner | |
| 2021/0241355 A1 | 8/2021 | Low | |
| 2021/0258299 A1 | 8/2021 | Thomas | |
| 2021/0264520 A1* | 8/2021 | Cummings | G06Q 40/12 |
| 2021/0266306 A1 | 8/2021 | Furman | |
| 2021/0271744 A1 | 9/2021 | Murdoch | |
| 2021/0273931 A1 | 9/2021 | Murdoch | |
| 2021/0286861 A1 | 9/2021 | Churchill | |
| 2021/0297311 A1 | 9/2021 | Arroju | |
| 2021/0306325 A1 | 9/2021 | Olden | |
| 2021/0314310 A1 | 10/2021 | Cao | |
| 2021/0328979 A1 | 10/2021 | M | |
| 2021/0352064 A1 | 11/2021 | Tsarfati | |
| 2021/0409223 A1 | 12/2021 | Subramanian | |
| 2021/0409403 A1 | 12/2021 | Lewin | |
| 2022/0021751 A1 | 1/2022 | Devine | |
| 2022/0086001 A1 | 3/2022 | Rahn | |
| 2022/0116393 A1 | 4/2022 | K | |
| 2022/0141214 A1 | 5/2022 | Mannengal | |
| 2022/0150066 A1 | 5/2022 | Sugarev | |
| 2022/0191185 A1 | 6/2022 | Carmon | |
| 2022/0210141 A1 | 6/2022 | Parekh | |
| 2022/0247787 A1 | 8/2022 | Lippert | |
| 2022/0294788 A1 | 9/2022 | Pattar | |
| 2022/0321335 A1 | 10/2022 | Lum | |
| 2023/0050628 A1 | 2/2023 | Jumelle | |
| 2023/0195859 A1 | 6/2023 | Woodward | |
| 2023/0198972 A1 | 6/2023 | Woodward | |
| 2024/0064136 A1 | 2/2024 | Woodward | |

\* cited by examiner

SYSTEMS AND METHODS FOR FACILITATING ASYNCHRONOUS SECURED POINT-TO-POINT COMMUNICATIONS

FIELD OF THE DISCLOSURE

The present disclosure relates to systems and methods for facilitating asynchronous secured point-to-point communications, in particular communication sessions over Internet Protocol (IP) networks without requiring centralized storage.

BACKGROUND

Using cloud storage to implement file sharing is known. Using Session Initiation Protocol (SIP) to initiate and support certain communications between computing devices is known.

SUMMARY

One aspect of the present disclosure relates to a system configured to facilitate asynchronous secured point-to-point communications between a first user and a second user without requiring centralized storage. The system may include electronic storage and one or more hardware processors configured by machine-readable instructions to: store information electronically, including different types of client-specific information, hardware information, key information, and permission information; receive a communication request from a first user; transfer a response to the communication request; receive a status check request from the second user; transfer a response to the status check request; receive a transfer request from the second user; transfer a response to the transfer request; receive a status request from the first user; and transfer a response to the status request.

Another aspect of the present disclosure relates to a method for facilitating asynchronous secured point-to-point communications between a first user and a second user without requiring centralized storage. The method may include storing information electronically, including different types of client-specific information, hardware information, key information, and permission information. The method may include receiving a communication request from a first user. The method may include transferring a response to the communication request. The method may include receiving a status check request from the second user. The method may include transferring a response to the status check request. The method may include receiving a transfer request from the second user. The method may include transferring a response to the transfer request. The method may include receiving a status request from the first user. The method may include transferring a response to the status request.

As used herein, any association (or relation, or reflection, or indication, or correspondency) involving servers, processors, client computing platforms, devices, JWTs, requests, different types of information, different types of verification, presentations, user interfaces, user interface elements, determinations, responses, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof. As used herein, the term "information security" may refer to software license management. As used herein, the term "authorization credential" may refer to a license, such as a software license.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
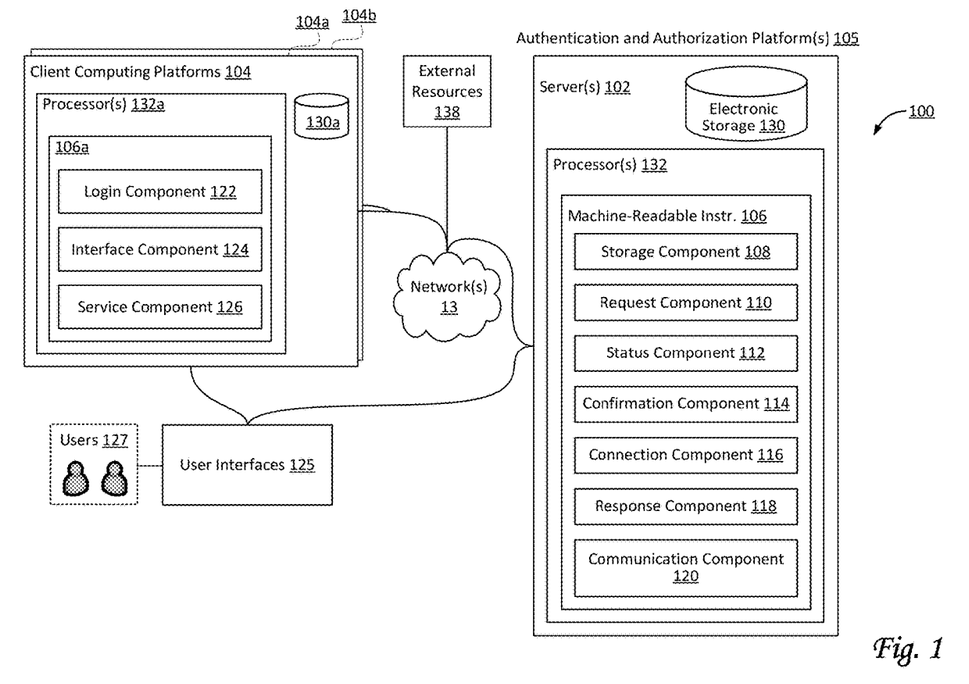
FIG. 1 illustrates a system configured to facilitate asynchronous secured point-to-point communications between a first user and a second user without requiring centralized storage, in accordance with one or more implementations.

FIG. 1 illustrates a system 100 configured to facilitate asynchronous secured point-to-point communications between a first user and a second user, in accordance with one or more implementations. In some implementations, the asynchronous secured point-to-point communications may be used to support file sharing, streaming services (e.g., voice-over-IP), and/or other communications (including but not limited to communications and/or sessions supported by Session Initiation Protocol (SIP)). By way of non-limiting example, system 100 may be used for facilitating asynchronous discovery and exchange of device identifiers (also referred to as device ID or hardware identifier), folder identifiers, and/or other information pertinent to asynchronous secured point-to-point communications.

By way of non-limiting example, at a high level, particular communications between a first user (using a first client computing platform 104a) and a second user (using a second client computing platform 104b) may be initiated by the first user transferring a request (e.g., a communication request) to an authentication and authorization platform 105, which may internally queue requests. Through out-of-band communication (e.g., via email), the second user is notified that some communication is available or in the process of being established. Subsequently, the second user may transfer a request (e.g., a status check request) to authentication and authorization platform 105, to check whether any requests are queued for the second user. If so, subsequently, the second user may transfer another request (e.g., a transfer request) to authentication and authorization platform 105, to indicate and/or confirm a willingness and/or readiness to participate in a particular request queued by authentication and authorization platform 105. Next, the first user may transfer a request (e.g., a status request) to authentication and authorization platform 105, to check whether the second user has indicated and/or confirmed a willingness and/or readiness to participate in the original communication request. Up to this point, each of first client computing platform 104a and second client computing platform 104b have only communicated with authentication and authorization platform 105, and not through a point-to-point communication with each other. At this point, first client computing platform 104a and second client computing platform 104b may establish a connection (e.g., a point-to-point connection) for the communication as originally requested (e.g., sharing one or more files), which may use a Session Initiation Protocol (SIP) Proxy (and/or discovery or relay servers). In some implementations, each of first client computing platform 104a and second client computing platform 104b may internally manage a queue of requests to control one or more asynchronous secured point-to-point communications. For example, first client computing platform 104a may manage a first queue and second client computing platform 104b may manage a second queue. In some implementations, an asynchronous secured point-to-point communication may be facilitated without requiring centralized storage. That is, the information to be shared will not need to be (temporarily) stored by authentication and authorization platform 105 or any other server used in the asynchronous secured point-to-point communication. In particular, even if the service and/or communication between first client computing platform 104a and second client computing platform 104b pertains to file sharing, these folders and/or files will not need to be (temporarily) stored anywhere besides first client computing platform 104a and second client computing platform 104b. In other words, centralized storage is not required for these asynchronous secured point-to-point communications. Individual requests received by authentication and authorization platform 105 are responded to individually, preferably through a response that includes a standard HyperText Transfer Protocol (HTTP) status code.

In some implementations, system 100 may include one or more authentication and authorization platforms 105, one or more client computing platforms 104, one or more servers 102, electronic storage 130, one or more processors 132, one or more user interfaces 125, external resources 138, and/or other components. Authentication and authorization platforms 105 and server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual ones of users 127 may be associated with individual client computing platforms 104. For example, a first user may be associated with first client computing platform 104a, a second user may be associated with second client computing platform 104b, and so forth. In some implementations, individual user interfaces 125 may be associated with individual client computing platforms 104. For example, a first user interface 125 may be associated with first client computing platform 104a, a second user interface 125 may be associated with second client computing platform 104b, and so forth.

Server(s) 102 may be configured by machine-readable instructions 106. Machine-readable instructions 106 may include one or more instruction components. The instruction components may include computer program components. The instruction components may include one or more of a storage component 108, a request component 110, a status component 112, a confirmation component 114, a connection component 116, a response component 118, a communication component 120, a login component 122, an interface component 124, a service component 126, and/or other instruction components. Electronic storage 130a may be similar to electronic storage 130, though included in client computing platforms 104. In some implementations, client computing platform 104a may include electronic storage 130a, in particular non-centralized storage that is local to client computing platform 104a. In some implementations, client computing platform 104b may include electronic storage 130a, in particular non-centralized storage that is local to client computing platform 104b. Processors 132a may be similar to processors 132, though included in client computing platforms 104. Machine-readable instructions 106a may be similar to machine-readable instructions 106, though included in client computing platforms 104.

Storage component 108 may be configured to store information electronically, e.g., in electronic storage 130. In some implementations, stored information may be indexed, organized, structured, and/or otherwise searchable. For example, the stored information may include tables, databases, relational databases, and/or other types of structural data storage. In some implementations, the stored information may include user information that identifies a set of authorized users that are authorized to access and/or use one or more software-controlled applications. As used herein, the term "software-controlled application" may refer to both (i) applications that are entirely software based, including but not limited to enterprise software, peer-to-peer software, and/or other types of software applications, and (ii) applications where a software component or a software layer is used to control a hardware application, including but not limited to code signing certificates, encrypted hard drives, security-enabled equipment, and/or other hardware applications that may be controlled by software.

In some implementations, the stored information may include registered hardware information that identifies a set of registered client computing platforms that have been registered to access and/or use one or more software-controlled applications. In some implementations, the stored information may include registered key information that identifies a set of registered keys for encryption and/or decryption that have been registered to access and/or use one or more software-controlled applications. As used herein, the term "public key" may include public keys, private keys, and/or other keys used for encryption and/or decryption of information. In some implementations, the stored information may include revoked key information that identifies a set of revoked keys for encryption and/or decryption that are no longer registered to access and/or use one or more software-controlled applications. For example, in some implementations, individual ones of the set of revoked keys for encryption and/or decryption may correspond to previously-registered client computing platforms that have been reported stolen or missing. In some implementations, the stored information may include assigned permission information that identifies a set of assigned authorization credentials that have been assigned to specific users and specific client computing platforms. Individual ones of the set of authorization credentials may be associated with individual expiration dates. In some implementations, the stored information may include revoked permission information that identifies a set of revoked authorization credentials that are no longer assigned for access and/or use of one or more software-controlled applications. In some implementations, the stored information may include available permission information that identifies a set of available authorization credentials that are available to be assigned to a specific user and a specific client computing platform.

In some implementations, the stored information may include permission information regarding authorization credential pools. For example, a particular pool or set or number of authorization credentials may be designated for a particular group of users. As long as the particular pool is not exhausted and/or otherwise fully assigned to group members, another user from the group may automatically be authenticated and/or authorized by system 100 such that an available authorization credential is assigned to this user.

In some implementations, the stored information may include at least a predetermined number of the following different types of information: (i) registered key information, (ii) revoked key information, (iii) user information that identifies a set of authorized users, (iv) registered hardware information, (v) assigned permission information, (vi) revoked permission information, and/or other information. In some implementations, the predetermined number may be 1, 2, 3, 4, and/or another number.

Request component 110 may be configured to receive requests from users 127. The requests may include communication requests, login requests, user requests, (automated) client requests, and/or other requests. In some implementations, a communication request from a particular user may include one or more of a machine identifier associated with a particular client computing platform 104 (which may be associated with the particular user), a payload identifier that identifies a payload, a recipient identifier that identifies another user (e.g., as intended recipient of the payload), a request identifier that identifies a particular communication request, and/or other information. Particular client computing platform 104 may include non-centralized storage (by way of non-limiting example, a particular NAS). Payload information may identify one or more electronic files and/or folders on this non-centralized storage. For example, a single communication request may include payload information that identifies two or more folders of electronic files on this non-centralized storage of particular client computing platform 104. In some implementations, a particular payload identifier may include a folder array identifying more than one folder as the payload of the communication request.

In some implementations, a login request may request user-specific authentication to access and/or use a particular software-controlled application. Alternatively, and/or simultaneously, in some implementations, a login request may request device-specific authorization to access and/or use a particular software-controlled application. In some implementations, individual login requests may be both user-specific and device-specific.

In some implementations, a user request may request continued access and/or use a particular software-controlled application. In some implementations, a user request may request user-specific authentication for continued access and/or use a particular software-controlled application. Alternatively, and/or simultaneously, in some implementations, a user request may request device-specific authorization for continued access and/or use a particular software-controlled application. In some implementations, individual user requests may be both user-specific and device-specific.

In some implementations, requests may include one or more of a user identifier that identifies a user, a hardware identifier that identifies a particular client computing platform 104, a machine identifier that identifies a particular public key, and/or other information. For example, in some implementations, a request may include a password that is provided by the user. For example, in some implementations, a request may include a device name that identifies a particular client computing platform 104 (e.g., that is currently being used by the user to provide the request). In some implementations, requests may include client-provided information, including but not limited to client-provided JavaScript Object Notation (JSON) Web Tokens (JWTs), client-provided expiration dates, client-provided machine identifiers, client-provided hardware identifiers, and/or other client-provided information. As used herein, the term "client-provided" may refer to information extracted by client-side software, or retrieved by client-side software, and/or otherwise provided by a client computing platform, on behalf of a user of a client computing platform, and/or by a user of a client computing platform.

In some implementations, hardware identifiers may be added to and/or provided by individual client computing platforms 104 as part of a request. For example, a hardware identifier may be a Media Access Control (MAC) address, which may be supplied and/or otherwise provided by an individual client device. In some implementations, hardware identifiers may be a machine name, or may include a machine name, or may be a combination of a MAC address and a machine name.

In some implementations, machine identifiers may identify a public key used for Public Key Infrastructure (PKI). In some implementations, a particular machine identifier may be (or include) a textual representation of a public key and/or another (generated) certificate. In some implementations, a particular machine identifier may be (or include) a textual representation of a device fingerprint or machine fingerprint. For example, the particular machine identifier may include information about the specific hardware and/or software of a particular device. In some implementations, a machine identifier may be created by hashing a certificate and/or public key. In some implementations, in response to an individual request from a particular client computing platform 104, system 100 (particularly, response component 118) may be configured to transfer an individual response to the particular client computing platform 104.

Status component 112 may be configured to receive requests and/or status-related messages from individual client computing platforms 104. For example, status component 112 may receive a status check request (also referred to as a "recipient status request" or "participant status request")

from a particular client computing platform 104 (e.g., second client computing platform 104b). In some implementations, a status check request verifies whether authentication and authorization platform 105 has any outstanding communication requests (e.g., in its queue) that have a particular client computing platform 104 (e.g., second client computing platform 104b) as its intended recipient. In some implementations, a status check request includes a particular machine identifier and/or other information associated with a particular client computing platform 104 (here, second client computing platform 104b). For example, a first user may have notified a second user regarding some communication that is available or in the process of being established (here, between the first user and the second user, such as, e.g., sharing one or more folders or electronic files from the first user to the second user). In some implementations, a communication request for (peer-to-peer) file sharing may be referred to as a share request. In some implementations, status component 112 may be configured to receive certain types of requests (including but not limited to status check requests and status requests) periodically, repeatedly, and/or otherwise more than once. For example, response to receiving a response that does not indicate acceptance, second client computing platform 104b may repeat the transfer of a status check request. For example, response to receiving a response that does not indicate acceptance, first client computing platform 104a may repeat the transfer of a status request.

As another example, status component 112 may receive a status request (also referred to as a "sender status request" or "initiator status request") from a particular client computing platform 104 (e.g., first client computing platform 104a). In some implementations, a status request verifies whether authentication and authorization platform 105 has been notified by a particular client computing platform 104 (e.g., second client computing platform 104b) to indicate and/or confirm a willingness and/or readiness to participate in a particular request queued by authentication and authorization platform 105 (e.g., through a transfer request received by confirmation component 114). In some implementations, a status request includes a particular request identifier and/or other information that identifies a particular communication request.

Confirmation component 114 may be configured to receive requests and/or request-related messages from individual client computing platforms 104. For example, confirmation component 114 may receive a transfer request (also referred to as a "confirmation request" or "participant ready request") from a particular client computing platform 104 (e.g., second client computing platform 104b). In some implementations, a transfer request indicates and/or confirms a willingness and/or readiness to participate in a particular request queued by authentication and authorization platform 105.

Response component 118 may be configured to transfer responses to requests, including communication requests, login requests, status check requests, status requests, transfer requests, user requests, and/or other types of requests. In some implementations, individual responses may include identifiers, including but not limited to request identifiers that identify a particular (communication) request. In some implementations, individual responses may include JWTs (e.g., provided to the user that made the request). In some implementations, individual responses may include individual standard HyperText Transfer Protocol (HTTP) status codes. In particular, responses may conform to the HTTP application layer protocol. For example, an individual standard HTTP status code may be "200", "201", "401", "402", "403", "404", "410", and/or other standard HTTP status codes. For example, a "200" status code may indicate a request has been accepted. For example, a "201" status code may indicate a request has been accepted, and a new resource has been created in the process. For example, a "401" status code may indicate the request has not been accepted due to some (client) error. For example, a "402" status code may indicate the request has not been accepted due to some (client) error that requires a payment. For example, a "403" status code may indicate the request has not been accepted due to some (client) error that represents the client has no access, or no longer has access. For example, a "410" status code may indicate the request has not been accepted due to some (client) error that represents a removal or revocation of rights. In some implementations, individual responses may include or use so-called "raw sockets". In some implementations, individual responses may conform to Quick UDP Internet Connections (QUIC). Other protocols and formats are considered within the scope of this disclosure. In some implementations, responses by response component 118 may be performed in response to (or subsequent to) one or more verifications or other actions by system 100.

For example, in some implementations, response component 118 may respond to a communication request with a "201" status code responsive to authentication and authorization platform 105 queueing a particular communication request. For example, in some implementations, response component 118 may respond to a communication request with a "200" status code (in addition to multiple machine identifiers) responsive to a particular communication request being associated with multiple client computing platforms 104 (according to authentication and authorization platform 105). Such a response may be interpreted by a client-side application (here, by first client computing platform 104a) such that the first user can select which client computing platform 104 should be associated with (and/or added to) a particular communication request.

For example, in some implementations, response component 118 may respond to a status check request with a "200" status code (in addition to one or more request identifiers). Such a response with multiple request identifiers may be interpreted by a client-side application (here, by second client computing platform 104b) such that the second user can select which communication request to refer to in the subsequent transfer request.

For example, in some implementations, response component 118 may respond to a transfer request with a "200" or "201" status code. Such a response may be interpreted by a client-side application and/or by authentication and authorization platform 105 that second client computing platform 104b is willing and/or ready to participate in a particular request queued by authentication and authorization platform 105. In some implementations, the corresponding communication may be a direct point-to-point communication between first client computing platform 104a and second client computing platform 104b. In some implementations, the corresponding communication may be a direct point-to-point communication between first client computing platform 104a and second client computing platform 104b. In some implementations, through SIP Proxy services, first client computing platform 104a and second client computing platform 104b may use one or more relay servers to establish communications.

For example, in some implementations, response component 118 may respond to a status request with a "201" status code. Such a response may be interpreted by a client-side application (here, by first client computing platform 104*a*) to indicate the second user has indicated and/or confirmed a willingness and/or readiness to participate in a particular request queued by authentication and authorization platform 105, by providing a particular transfer request for the particular communication request. In some implementations, authentication and authorization platform 105 may be configured to remove this particular communication request from its queue at this point. Alternatively, a "40x" code may be interpreted as authentication and authorization platform 105 being unable to locate the particular communication request in its queue.

Connection component 116 may be configured to securely establish a point-to-point connection between two or more client computing platforms 104 (e.g., between first client computing platform 104*a* and second client computing platform 104*b*). For example, connections and/or communications may be secured by cryptography, including but not limited to the use of Public Key Infrastructure (PKI). In some implementations, connection component 116 may securely establish a point-to-point connection in accordance with a particular communication request (e.g., for the communication of a particular payload between first client computing platform 104*a* and second client computing platform 104*b*). In some implementations, connection component 116 may establish a communication session over Internet Protocol (IP) networks in a manner supported by Session Initiation Protocol (SIP), e.g., through a SIP Proxy. As used herein, a point-to-point connection may be relayed, e.g., by a relay server. In some implementations, one or more features and/or functions attributed to connection component 116 may be implemented by service component 126.

Communication component 120 may be configured to securely communicate between two or more client computing platforms 104 (e.g., between first client computing platform 104*a* and second client computing platform 104*b*). In some implementations, communication component 120 may securely communicate in accordance with a particular communication request (e.g., for the point-to-point communication of a particular payload between first client computing platform 104*a* and second client computing platform 104*b*). In some implementations, communication component 120 may securely communicate using a point-to-point connection established by connection component 116. In some implementations, communication component 120 may communicate over Internet Protocol (IP) networks in a manner supported by Session Initiation Protocol (SIP), e.g., through a SIP Proxy. As used herein, point-to-point communication may be relayed, e.g., by a relay server. In some implementations, one or more features and/or functions attributed to communication component 120 may be implemented by service component 126.

Referring to FIG. 1, login component 122 may be configured to receive user input (e.g., from one or more users 127) on client computing platforms 104. For example, the user input may represent a particular communication request, by a particular (first) user. Login component 122 may be configured to provide requests to authentication and authorization platform 105 (and, in particular, to request component 110). Responses from authentication and authorization platform 105 (and, in particular, from response component 118) may be provided to client computing platforms 104 (and, in particular, to login component 122). In some implementations, user input received by login component 122 may include a user identifier, a password, payload information (e.g., an array of folder identifiers), a recipient identifier (e.g., a name and/or an email address for the second user), and/or other information. In some implementations, login component 122 may be configured to add certain information to the received user input to form requests, including but not limited to a hardware identifier, a machine identifier, a (communication) request identifier, and/or other information. For example, this information may be available locally on the particular client computing platform 104. In some implementations, login component 122 may (regularly and/or at recurring intervals) automatically provide (e.g., to authentication and authorization platform 105) user requests that request continued access and/or use of the particular software-controlled application. Certain responses received from authentication and authorization platform 105 may prompt actions by client computing platforms 104, e.g., by login component 122.

Referring to FIG. 1, interface component 124 may be configured to generate, effectuate, and/or present user interfaces 125 on client computing platforms 104 to users. For example, interface component 124 may be configured to present a particular user interface 125 on a particular client computing platform 104 to a particular user. For example, particular user interface 125 may include one or more portions or sections. The one or more portions and/or sections may include a first portion, a second portion, a third portion, a fourth portion, and so forth. In some implementations, a portion of a particular user interface 125 may enable a user to enter and/or select information and/or actions, including but not limited to a particular user identifier, a particular password, and a graphical user interface element to transfer a user request to authentication and authorization platform 105. In some implementations, a portion of particular user interface 125 may be used to present a response to the user (e.g., from response component 118). By way of non-limiting example, see FIG. 4 for an exemplary user interface 400.

Referring to FIG. 1, service component 126 may be configured to facilitate interaction with a SIP Proxy and/or otherwise provide SIP Proxy services. For example, first client computing platform 104*a* may provide an IP address during discovery (e.g., using a discovery server). For example, second client computing platform 104*b* may provide a (destination) IP address during discovery (e.g., using a discovery server). By way of non-limiting example, service component 126 may implement one or more features and/or functions attributed to connection component 116, including but not limited to establishing a communication session over Internet Protocol (IP) networks in a manner supported by Session Initiation Protocol (SIP). In some implementations, service component 126 may implement one or more features and/or functions attributed to communication component 120, including but not limited to securely communicate in accordance with a particular communication request (e.g., for the point-to-point communication of a particular payload between first client computing platform 104*a* and second client computing platform 104*b*). In some implementations, service component 126 may provide access to open source software, including but not limited to open source software related to SIP services.

Figure 3:
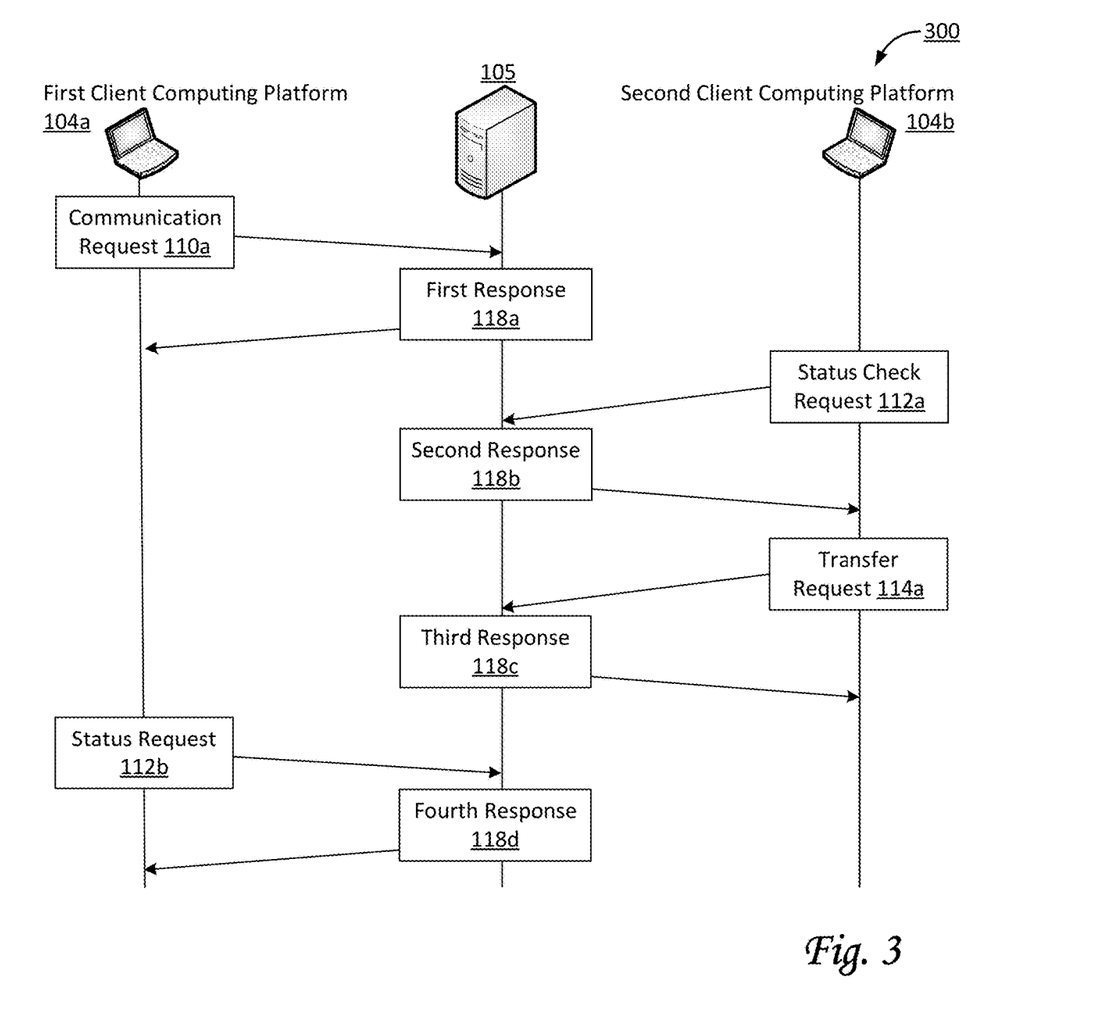
FIG. 3 illustrate an exemplary flow chart as may be used in a system to facilitate asynchronous secured point-to-point communications between a first user and a second user, in accordance with one or more implementations.

By way of non-limiting example, FIG. 3 illustrates an exemplary flow chart 300 as may be used in system 100 (in particular, by authentication and authorization platform 105). Flow chart 300 may start at Communication Request 110*a* (from first client computing platform 104*a* to authentication and authorization platform 105) as depicted in FIG. 3, followed by First Response 118*a* (from authentication and authorization platform 105 to first client computing platform 104*a*). Subsequently, flow chart 300 may continue at Status Check Request 112*a* (from second client computing platform 104*b* to authentication and authorization platform 105) as depicted in FIG. 3, followed by Second Response 118*b* (from authentication and authorization platform 105 to second client computing platform 104*b*). Subsequently, flow chart 300 may continue at Transfer Request 114*a* (from second client computing platform 104*b* to authentication and authorization platform 105) as depicted in FIG. 3, followed by Third Response 118*c* (from authentication and authorization platform 105 to second client computing platform 104*b*). Subsequently, flow chart 300 may continue at Status Request 112*b* (from first client computing platform 104*a* to authentication and authorization platform 105) as depicted in FIG. 3, followed by Fourth Response 118*d* (from authentication and authorization platform 105 to first client computing platform 104*a*). Individual responses may include individual standard HTTP status codes.

Figure 4:
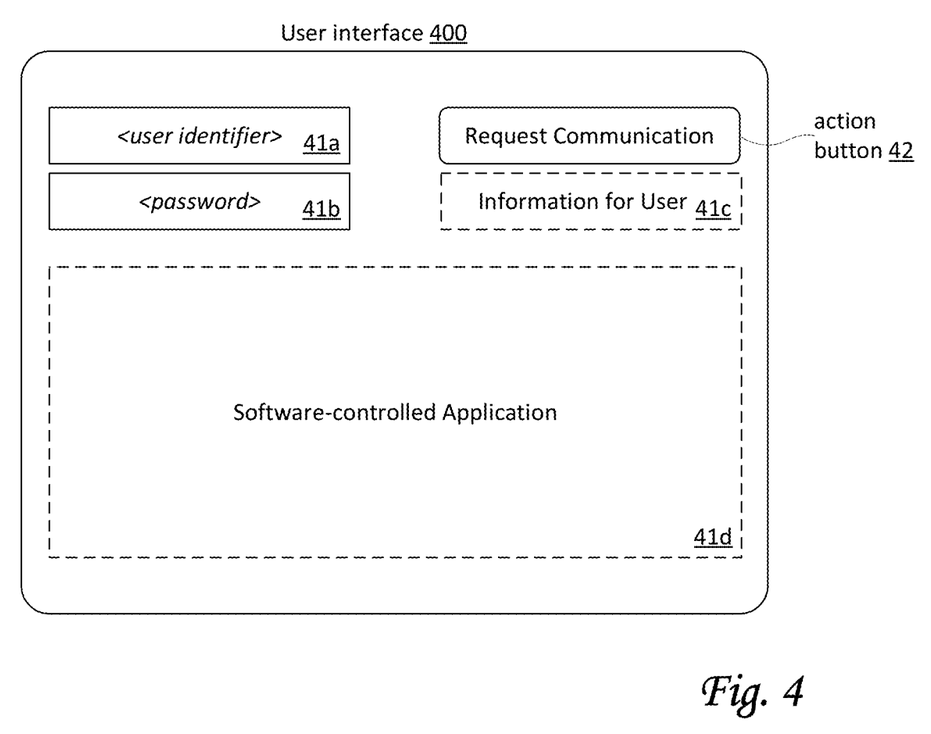
FIG. 4 illustrates an exemplary user interface as may be provided to users of a system configured to facilitate asynchronous secured point-to-point communications between a first user and a second user, in accordance with one or more implementations.

By way of non-limiting example, FIG. 4 illustrates an exemplary user interface 400 as may be present to a user on a particular client computing platform. User interface 400 may include graphical user interface elements 41*a* and 41*b* that are configured for a user to enter and/or select information (including but not limited to a particular authorization credential). For example, element 41*a* may be used to enter a user identifier and element 41*b* may be used to enter a password. User interface 400 may include an action button 42 labeled "Request Communication". Upon selection and/or engagement of action button 42, user interface 400 may initiate and/or otherwise provide one or more requests (including a particular communication request) to authentication and authorization platform 105. For example, a first request may be a login request to a particular software-controlled application, based on the entered user identifier and password. For example, a second request may be a communication request for continued access and/or use of the particular software-controlled application that implements file sharing. User interface 400 may include graphical user interface element 41*c*, labeled "Information for User", which may be used by the system to provide information to the user, including but not limited to feedback, comments, or prompts. For example, a client-side application may interpret responses from authentication and authorization platform 105 (including but not limited to standard HTTP status codes) and provide information to the user, through graphical user interface element 41*c*, that is based on the responses from authentication and authorization platform 105. User interface 400 may include graphical user interface element 41*d*, labeled "Software-controlled application", which may be used by the system to provide (continued) access to the particular software-controlled application as requested by the user.

Referring to FIG. 1, in some implementations, authentication and authorization platform(s) 105, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which components may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 125 may be configured to facilitate interaction between users and system 100 and/or between users and client computing platforms 104. For example, user interfaces 125 may provide an interface through which users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, sensors to capture facial characteristics, biometric sensors, and/or other user interface devices configured to receive and/or convey user input and/or information from a user. In some implementations, user interface 125 may be configured to support face recognition, iris recognition, RFID implants, and/or other personalization technologies. In some implementations, one or more user interfaces 125 may be included in one or more client computing platforms 104. In some implementations, one or more user interfaces 125 may be included in system 100.

In some implementations, assignment verifications may be performed by system 100 to verify whether a particular authorization credential (e.g., the authorization credential associated with a client-provided hardware identifier and a client-provided machine identifier in a particular request) corresponds to one of the authorization credentials in the set of assigned authorization credentials (e.g., as included in the stored information).

In some implementations, authorization credential-revocation verifications may be performed by system 100 to verify whether a particular authorization credential (e.g., the authorization credential associated with a client-provided hardware identifier and a client-provided machine identifier in a particular request) corresponds to one of the authorization credentials in the set of revoked authorization credentials (e.g., as may be included in the stored information). In some implementations, authorization credential-revocation verifications may be performed by system 100 to verify whether a particular authorization credential (e.g., the authorization credential associated with a client-provided hardware identifier and a client-provided machine identifier in a particular request) corresponds to one of the authorization credentials in a set of authorization credentials that are no longer assigned (or authorized) for access and/or use of a particular software-controlled application.

In some implementations, expiration verifications may be performed by system 100 to verify whether particular authorization credentials and/or JWTs have expired. In some implementations, expiration may be based on individual expiration dates that are associated with individual authorization credentials. Expiration dates may be included in the stored information.

In some implementations, authorization credential-availability verifications may be performed by system 100 to verify whether the set of available authorization credentials includes an individual available authorization credential (e.g., that is currently available, or that is available in view of certain context such as identifiers and/or other information). For example, in some implementations, an authorization credential may be available provided that it is unassigned, unrevoked, and available to be assigned to a particular user. In some implementations, availability may be determined in view of an authorization credential pool. For example, a particular group of users may use an authorization credential pool that includes a particular number of authorization credentials such that there may only be an available authorization credential if less than the number of authorization credentials in the pool is currently assigned to the group of users that use the authorization credential pool.

External resources 138 may include sources of information outside of system 100, external entities participating with system 100, and/or other resources. In some implementations, external resources 138 may include a provider of information which may be used by system 100. In some implementations, external resources 138 may include a provider of particular software-controlled applications which may be made available to users through system 100. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable or capable of being coupled operationally to server(s) 102 via, for example, a port (e.g., a USB port, a firewire port, etc.) or a drive (e.g., a disk drive, etc.) or networked storage (e.g., network-attached storage (NAS), storage area network (SAN), etc.). In some implementations, electronic storage 130a included in first client computing platform 104a may include a first network-attached storage (NAS). In some implementations, electronic storage 130a included in second client computing platform 104b may include a second network-attached storage (NAS). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information, whether local or remote, or both. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2:
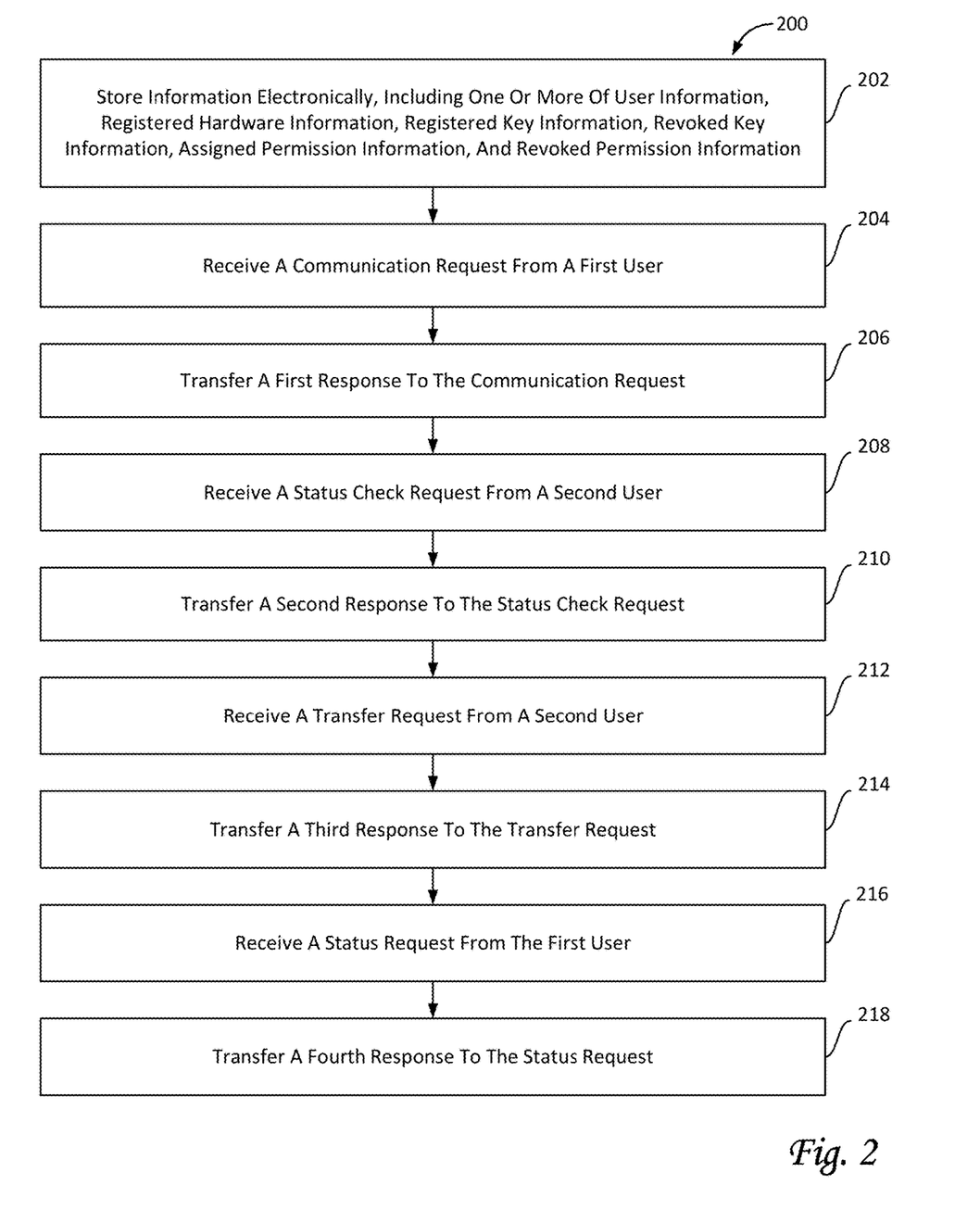
FIG. 2 illustrates a method for facilitating asynchronous secured point-to-point communications between a first user and a second user without requiring centralized storage, in accordance with one or more implementations.

FIG. 2 illustrates a method 200 for facilitating asynchronous secured point-to-point communications between a first user and a second user without requiring centralized storage, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The stored information includes at least three of: (i) registered key information that identifies a set of registered keys for encryption and/or decryption that have been registered for the asynchronous secured point-to-point communications, (ii) revoked key information that identifies a set of revoked keys for encryption and/or decryption that are no longer registered for the asynchronous secured point-to-point communications due to being revoked, (iii) user information that identifies a set of authorized users that are authorized for the asynchronous secured point-to-point communications, (iv) registered hardware information that identifies a set of registered client computing platforms that have been registered for the asynchronous secured point-to-point communications, (v) assigned permission information that identifies a set of assigned authorization credentials that have been assigned to specific users and specific client computing platforms. Individual ones of the set of authorization credentials are associated with individual expiration dates, and (vi) revoked permission information that identifies a set of revoked authorization credentials that are no longer assigned for the asynchronous secured point-to-point communications due to being revoked. In some embodiments, operation 202 is performed by a storage component the same as or similar to storage component 108 (shown in FIG. 1 and described herein).

At an operation 204, a communication request is received from the first user. The communication request includes: (i) a first machine identifier associated with the first client computing platform, (ii) a payload identifier that identifies a payload on the first non-centralized storage, (iii) a recipient identifier that identifies the second user as intended recipient of the payload, (iv) a request identifier that identifies the communication request. In some embodiments, operation 204 is performed by a request component the same as or similar to request component 110 (shown in FIG. 1 and described herein).

At an operation 206, a first response is transferred to the communication request. The first response includes a first standard HTTP status code that indicates the communication request has been accepted. In some embodiments, operation 206 is performed by a response component the same as or similar to response component 118 (shown in FIG. 1 and described herein).

At an operation 208, a status check request is received from the second user. The status check request includes a second machine identifier associated with the second client computing platform. In some embodiments, operation 208 is performed by a status component the same as or similar to status component 112 (shown in FIG. 1 and described herein).

At an operation 210, a second response is transferred to the status check request. The second response includes a second standard HTTP status code that indicates the status check request has been accepted. The second response further includes the request identifier that identifies the communication request. In some embodiments, operation 210 is performed by a response component the same as or similar to response component 118 (shown in FIG. 1 and described herein).

At an operation 212, a transfer request is received from the second user. The transfer request includes the request identifier that identifies the communication request. In some embodiments, operation 212 is performed by a confirmation component the same as or similar to confirmation component 114 (shown in FIG. 1 and described herein).

At an operation 214, a third response is transferred to the transfer request. The third response includes a third standard HTTP status code that indicates whether the transfer request has been accepted. In some embodiments, operation 214 is performed by a response component the same as or similar to response component 118 (shown in FIG. 1 and described herein).

At an operation 216, a status request is received from the first user. The status request includes the request identifier that identifies the communication request. In some embodiments, operation 216 is performed by a status component the same as or similar to status component 112 (shown in FIG. 1 and described herein).

At an operation 218, a fourth response is transferred to the status request. The fourth response includes a fourth standard HTTP status code that indicates whether the status request has been accepted. In some embodiments, operation 218 is performed by a response component the same as or similar to response component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate asynchronous establishment of a secured point-to-point connection between a first client computing platform having first non-centralized storage associated with a first user and a second client computing platform having second non-centralized storage associated with a second user, wherein the secured point-to-point connection facilitates communication between the first user and the second user without requiring centralized storage, the system comprising:
   an authorization platform having one or more hardware processors configured by machine-readable instructions to:
      receive a communication request from the first user via the first client computing platform, wherein the communication request includes: (i) a first machine identifier associated with the first client computing platform, (ii) a payload identifier that identifies a payload on the first non-centralized storage, and (iii) a recipient identifier that identifies the second user as intended recipient of the payload;
      transfer a first response to the communication request to the first client computing platform, wherein the first response indicates the communication request has been accepted by the authorization platform;
      receive a status check request from the second user via the second client computing platform, wherein the status check request includes a second machine identifier associated with the second client computing platform;

transfer a second response to the status check request to the second client computing platform, wherein the second response indicates the status check request has been accepted by the authorization platform;

receive a transfer request from the second user via the second client computing platform, wherein the transfer request identifies the communication request; and transfer a third response to the transfer request to the second client computing platform, wherein the third response indicates the transfer request has been accepted by the authorization platform; and wherein the first client computing platform and the second client computing platform are configured to:

securely establish the secured point-to-point connection between the first client computing platform and the second client computing platform in accordance with the communication request for the communication of the payload; and securely communicate the payload from the first non-centralized storage of the first client computing platform to the second non-centralized storage of the second client computing platform.

2. The system of claim 1, wherein the first response includes a first standard HyperText Transfer Protocol (HTTP) status code.

3. The system of claim 1, wherein the second response includes a second standard HyperText Transfer Protocol (HTTP) status code, and wherein the second response includes particular information that identifies the communication request.

4. The system of claim 1, wherein the second client computing platform is configured to store the payload in the second non-centralized storage.

5. The system of claim 1, wherein the communication request further includes a client-provided user identifier that identifies the first user, and wherein the first machine identifier is associated with a first public key that is used for Public Key Infrastructure (PKI).

6. The system of claim 1, wherein receiving the status check request is performed periodically, and wherein receiving the status check is performed periodically.

7. The system of claim 1, wherein the communication request is a share request, and wherein the asynchronous secured point-to-point communications are used for peer-to-peer file sharing between the first user and the second user.

8. The system of claim 7, wherein the payload identifier represents a folder array including multiple file folders, wherein the payload includes electronic files in the multiple file folders, wherein the electronic files are stored on the first non-centralized storage.

9. A method of facilitating asynchronous establishment of a secured point-to-point connection between a first client computing platform having first non-centralized storage associated with a first user and a second client computing platform having second non-centralized storage associated with a second user, wherein the secured point-to-point connection facilitates communication between the first user and the second user without requiring centralized storage, the method comprising:

receiving a communication request from the first user via the first client computing platform, wherein the communication request includes: (i) a first machine identifier associated with the first client computing platform, (ii) a payload identifier that identifies a payload on the first non-centralized storage, and (iii) a recipient identifier that identifies the second user as intended recipient of the payload;

transferring a first response to the communication request to the first client computing platform, wherein the first response indicates the communication request has been accepted;

receiving a status check request from the second user via the second client computing platform, wherein the status check request includes a second machine identifier associated with the second client computing platform;

transferring a second response to the status check request to the second client computing platform, wherein the second response indicates the status check request has been accepted;

receiving a transfer request from the second user via the second client computing platform, wherein the transfer request identifies the communication request;

transferring a third response to the transfer request to the second client computing platform, wherein the third response indicates the transfer request has been accepted;

securely establishing, by the first client computing platform and the second client computing platform, the secured point-to-point connection between the first client computing platform and the second client computing platform in accordance with the communication request for the communication of the payload; and securely communicating the payload from the first non-centralized storage of the first client computing platform to the second non-centralized storage of the second client computing platform.

10. The method of claim 9, wherein the first response includes a first standard HyperText Transfer Protocol (HTTP) status code.

11. The method of claim 9, wherein the second response includes a second standard HyperText Transfer Protocol (HTTP), and wherein the second response includes particular information that identifies the communication request.

12. The method of claim 9, further comprising:
storing the payload in the second non-centralized storage.

13. The method of claim 9, wherein the communication request further includes a client-provided user identifier that identifies the first user, and wherein the first machine identifier is associated with a first public key that is used for Public Key Infrastructure (PKI).

14. The method of claim 9, wherein receiving the status check request is performed periodically, and wherein receiving the status check is performed periodically.

15. The method of claim 9, wherein the communication request is a share request, and wherein the asynchronous secured point-to-point communications are used for peer-to-peer file sharing between the first user and the second user.

16. The method of claim 15, wherein the payload identifier represents a folder array including multiple file folders, wherein the payload includes electronic files in the multiple file folders, wherein the electronic files are stored on the first non-centralized storage.

* * * * *